Figure 1:
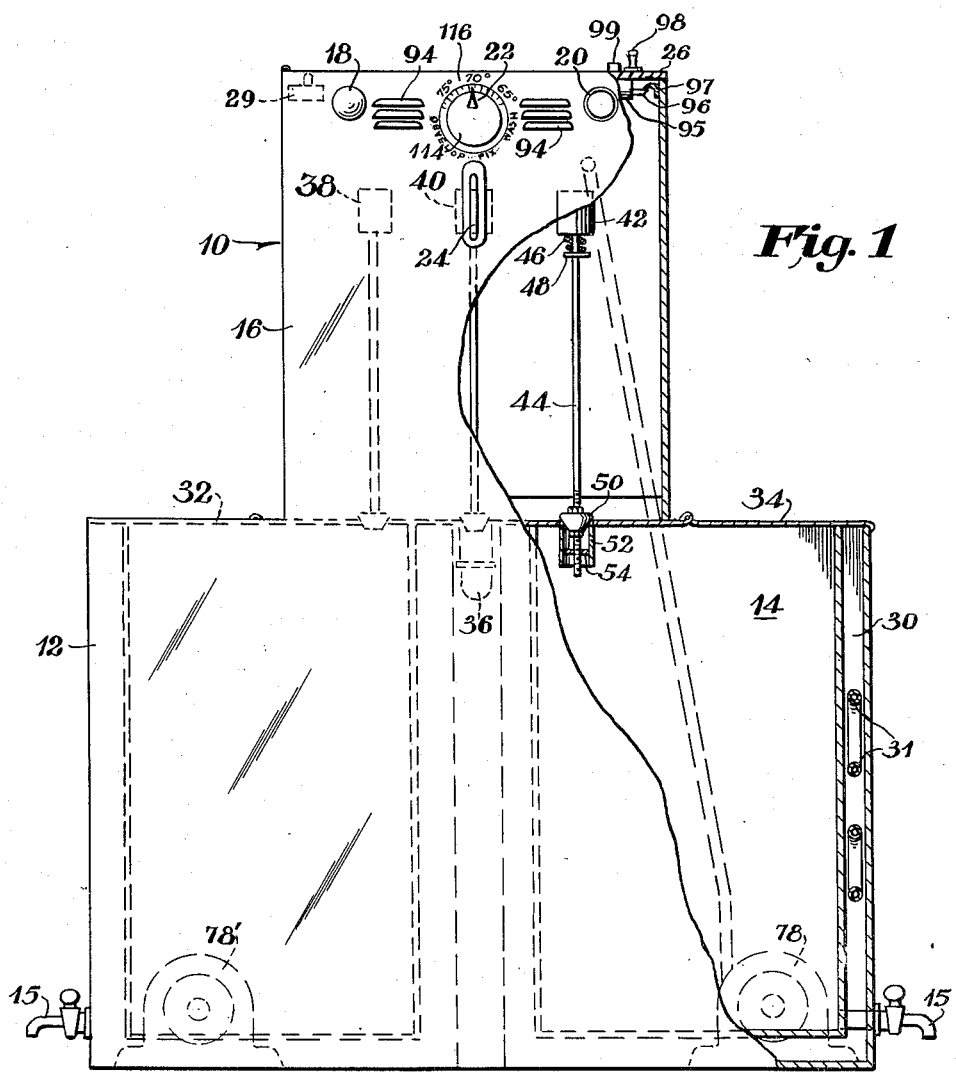

Dec. 19, 1950     C. KATZEN ET AL     2,534,603
AUTOMATIC X-RAY FILM PROCESSING APPARATUS

Filed May 6, 1947     4 Sheets-Sheet 1

Inventors:
Cyrus Katzen
Thomas R. Games

By Homer R. Montague
Attorney

Dec. 19, 1950

C. KATZEN ET AL 2,534,603

AUTOMATIC X-RAY FILM PROCESSING APPARATUS

Filed May 6, 1947

4 Sheets-Sheet 2

Inventors:

Cyrus Katzen
Thomas R. Games

By Homer R. Montague

Attorney

Dec. 19, 1950     C. KATZEN ET AL     2,534,603
AUTOMATIC X-RAY FILM PROCESSING APPARATUS

Filed May 6, 1947     4 Sheets-Sheet 3

Inventors:
Cyrus Katzen
Thomas R. Games

By Homer R. Montague
Attorney

Dec. 19, 1950  C. KATZEN ET AL  2,534,603
AUTOMATIC X-RAY FILM PROCESSING APPARATUS
Filed May 6, 1947  4 Sheets-Sheet 4

Inventors:
Cyrus Katzen
Thomas R. Games
By Homer R. Montague
Attorney

Patented Dec. 19, 1950

2,534,603

UNITED STATES PATENT OFFICE 2,534,603

AUTOMATIC X-RAY FILM PROCESSING APPARATUS

Cyrus Katzen and Thomas R. Games, Washington, D. C.

Application May 6, 1947, Serial No. 746,176

7 Claims. (Cl. 95—90)

This invention relates to fluid treatment apparatus for photographic purposes, and more particularly to apparatus for the automatic developing, fixing, washing and drying of exposed photographic films or plates. The invention as herein described in detail is particularly adapted for the processing of dental X-ray films, under standardized conditions, but it will be obvious that it is equally well suited to the development and fixing of other X-ray films or plates, of whatever size, by suitable changes in the size of the apparatus.

Dental and medical X-ray photography differs from general amateur and professional photography principally in that the conditions of exposure of the sensitized elements are rigidly standardized; that is, for a given subject and intensity of X-radiation, the required exposure time may readily be calculated, and it is common practice to utilize a timer in order to obtain negative images having optimum characteristics for diagnostic or record purposes. Heretofore, however, the advantages potentially present in such a standardized system of exposure have largely been forfeited by a more or less haphazard method of fluid processing or developing of the exposed films. While the proper conditions of time, concentration and temperature of the processing are well known, the application of these factors is hampered by reliance upon the human element in carrying the films through the various steps.

It is a principal object of our invention to provide an apparatus capable of providing, in the film processing steps, the same degree of control that has heretofore been available for the exposure process, to the end that the finished films are consistently of the highest possible quality. A secondary object of the invention is to provide such an apparatus in which the element of human control is largely or entirely eliminated, making it possible for films or plates of this character to be processed with a minimum of human supervision, and hence at higher speed, with greater convenience, and at a minimum operating cost.

With the requirements of the dental profession specifically in mind, it is a further object of the invention to provide such an apparatus which is extremely compact, relatively simple and foolproof in operation, and very largely self-contained, the only installation required being connections to the electrical mains, water supply and waste drain with which dental and medical offices are already provided. A still further object of the invention is to provide the apparatus with certain features of interlocking control which minimize or entirely eliminate the chance of spoilage of exposed films, and consequent delay and embarrassment now common under manual processing techniques.

An ancillary object of our invention is to provide an apparatus which is mechanically as simple as possible, in view of the functions performed, whereby a minimum of maintenance of the apparatus is required, the cost is reduced, and in operation it is dependable and long-lived.

Figure 4:
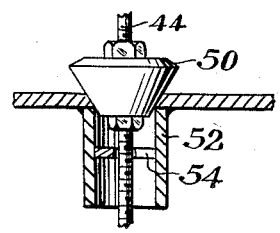
Figure 2:
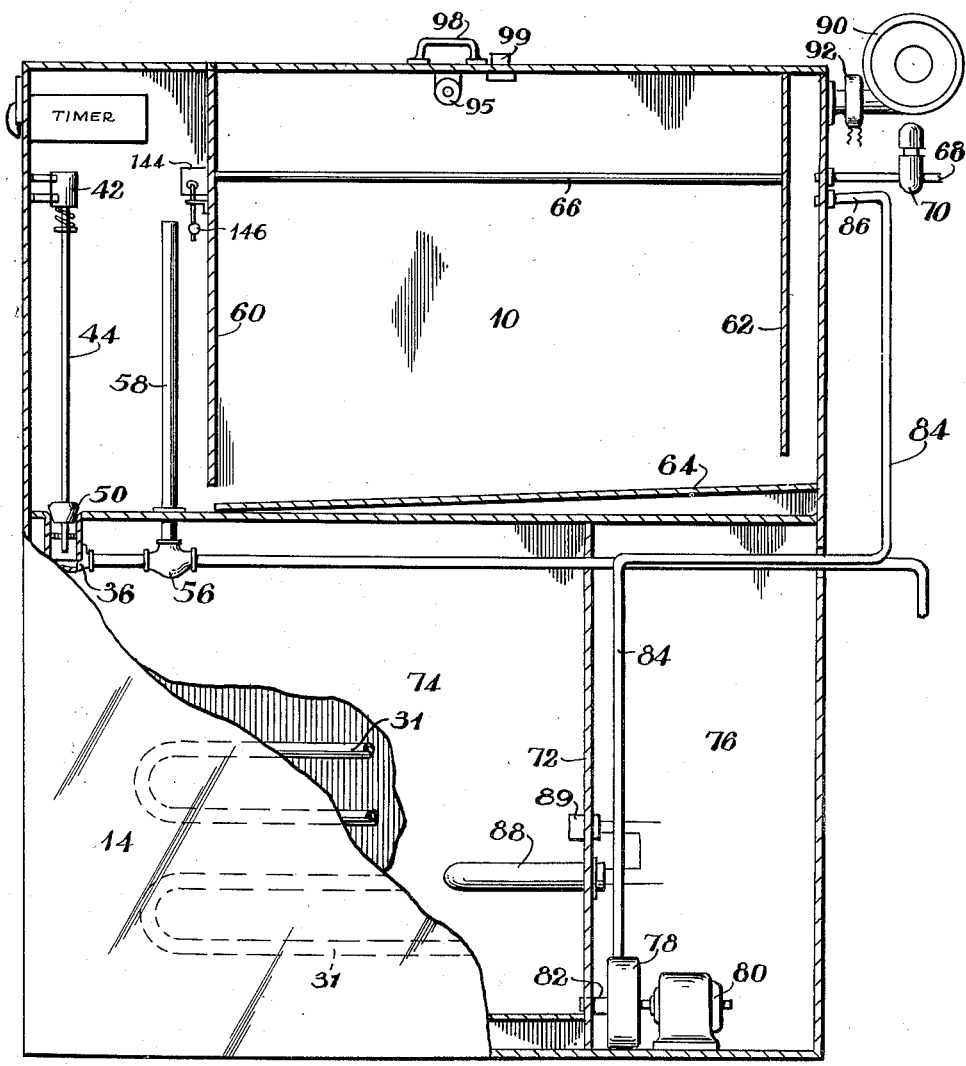
Figure 3:
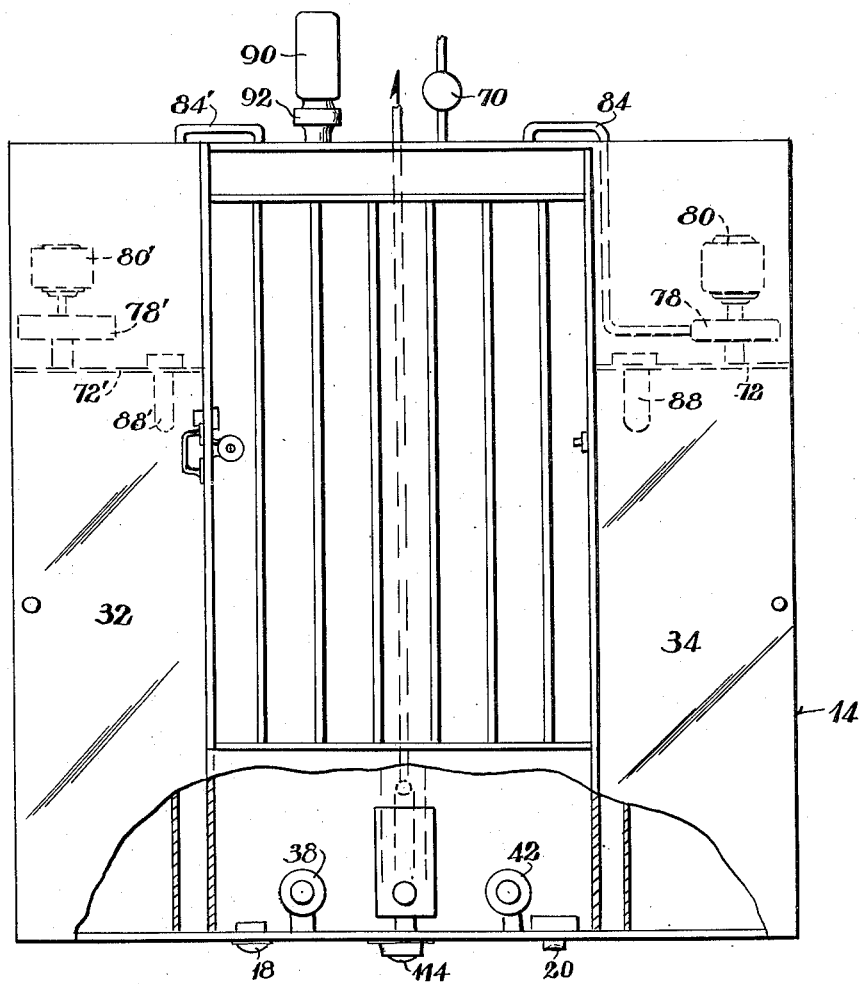
Figure 5:
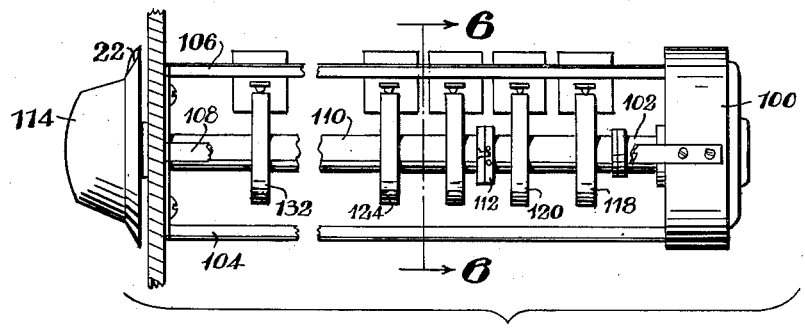
Figure 6:
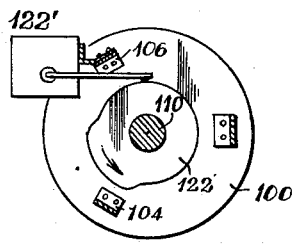
Figure 7:
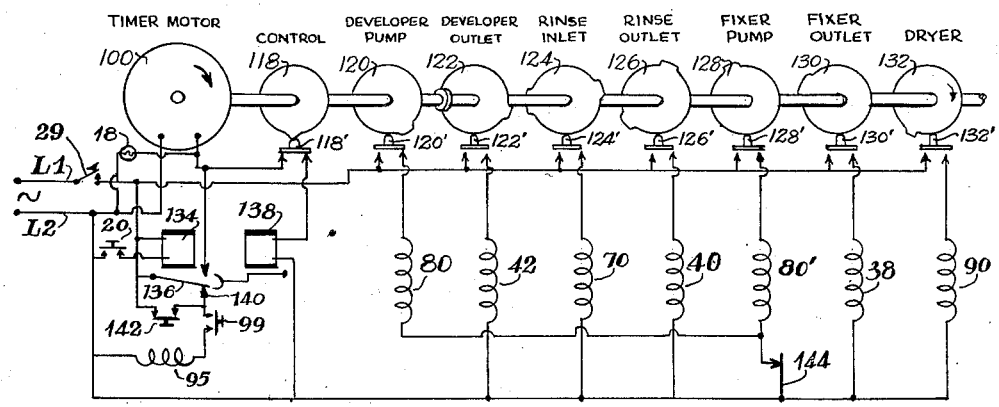
Figure 8:
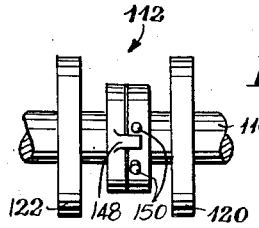

The above and other objects and advantages of our invention will best be understood by referring to the following detailed specification of a preferred embodiment thereof, it being understood that the principles thereof may be applied to similar apparatus of different size and complexity without departing from the scope of our invention as defined in the appended claims. In the accompanying drawings, which illustrate the device in the form best adapted to the development and other treatment of dental X-ray films, Fig. 1 illustrates the apparatus in front elevation, with a portion of the front panel broken away, Fig. 2 is a side elevation of the same device, also with portions broken away and parts shown in section, Fig. 3 is a plan view thereof, the cover of the treatment tank being in open (vertical) position, Fig. 4 is a detail sectional view of one form of dump valve used in the invention, Fig. 5 is a side elevation of one form of timer and control apparatus adapted for use with the foregoing, Fig. 6 is a sectional view taken on line 6—6 of Fig. 5, Fig. 7 is a diagrammatic view illustrating the relation of the timer control to the operating elements of the device, and, Fig. 8 is an enlarged view of a portion of Fig. 5.

In general, the apparatus of our invention comprises a single tank, chamber or the like adapted to contain the exposed film, such as dental X-ray films, throughout the processing operations, and a plurality, here two, of storage tanks or chambers adapted to contain a developer solution and a fixing solution respectively. In order to avoid the mechanical complexities attendant upon the removal of the films from one chamber to another for the various treatments, in our apparatus the films are allowed to remain in the single storage tank, and the necessary solutions and the wash or rinse water are supplied to this tank in proper order, under the control of a suitable timer, solenoid operated valves and fluid pumps. Also, as a final step in the process, a current of warm, dry air may be forced through the treatment chamber in order to expedite the drying of the films, although this feature is strictly optional, since the drying step may if desired be carried out after removal of the developed and fixed films from the apparatus.

Referring now to Fig. 1 of the drawings, there is illustrated the chamber or tank 10 adapted to contain the exposed films throughout their treatment, located above a pair of fluid storage tanks 12 and 14, and all of which may be connected together as an integral unit. The forward wall 16 of tank 10, which may also extend downward to serve as the common forward wall of tanks 12 and 14, acts as a control panel and has mounted thereon a signal lamp 18 serving as an "in use" indicator, a manually operable "start" button 20, and the indicating dial 114 of a timer mechanism to be more particularly described hereinafter. Dial 114 carries a pointer 22, and beneath the dial is arranged the indicator 24 of a thermometer whose sensitive bulb is located in one of the storage tanks 12 or 14.

Tank 10 is provided with a lid or cover 26, and may desirably be internally coated with a suitable material to facilitate the drainage therefrom of the fluids used in the process. Such a coating is a hard wax containing varnish, or a layer of a suitable plastic incapable of wetting by the solutions, which acts to minimize the loss of developer and fixed solutions when the tank is periodically drained. Cover 26 is normally locked closed, during an operating cycle, by a solenoid-operated latch 96. As described below, this latch prevents opening of cover 26 except at such times as no damage would result to the films in the tank. Also, a normally open door-operated switch 29 is provided and connected in the main power line to ensure that door 26 is properly closed before starting an operating cycle.

As shown in Fig. 1, each of tanks 12 and 14 is or may be of double-wall or jacket construction. The space 30 between such walls may be filled with a circulating coolant, or, since the interspace is accessible from the tops of the tanks, crushed ice or ice water may be placed therein from time to time in order to maintain a proper processing temperature when the atmospheric temperature is excessively high. Each of the tanks 12 and 14 is provided with a hinged lid (denoted 32 and 34 respectively), covering such part of these tanks as extends beyond the profile of the superposed treatment tank 10. While separate jackets are shown for tanks 12 and 14, it will be understood that these may be in communication with one another, or a single common jacket may be employed. Such arrangement is conducive to maintaining equality of temperature between the developer and fixer, a condition which is desirable to avoid the reticulation of gelatin on the films. Petcocks such as shown at 15 are provided to permit drainage of the storage tanks and/or any cooling fluid within the jackets 30. Where a considerable degree of cooling is required, a coolant may be circulated within the jackets 30, as through the conduits 31 of Figs. 1 and 2. Ordinarily, cold running water will be suitable for this purpose.

Tanks 12 and 14 may be separated laterally from one another to accommodate therebetween a drain connection 36, leading from the front center of tank 10 at its bottom, and thence rearwardly (see Fig. 2) for connection, as by a flexible hose, to a sink or the like. Mounted on the rear face of the front wall 16 are three solenoids designated 38, 40 and 42, each of which is adapted when energized to raise a valve control rod such as rod 44 normally biased downwardly by a spring 46 bearing upon a shoulder 48 fixed to the rod. At its lower end, rod 44 carries a valve plug 40 (see also Fig. 4), seated in an opening in the horizontal partition between tanks 10 and 14. Extending down from this opening is a pipe or tube 52 in which is guided the lower end of rod 44, as by a foraminous washer or spider 54 mounted in pipe 52 and apertured to receive this rod. It will be clear from the above that energization of solenoid 42 will act to raise rod 44 against the pressure of spring 46 and open the valve plug 50 to permit the contents of tank 10 to discharge by gravity into storage tank 14. This arrangement permits a total discharge of the tank contents, because, when valve plug 50 is elevated, there is no lateral obstruction around the aperture in the floor of tank 10. A similar valve is connected for operation by solenoid 38 to permit the contents of tank 10 to be dumped alternatively into storage tank 12, and a third such valve is operable by solenoid 40 to connect tank 10 with the drain connection 36. This latter construction is best shown in Fig. 2, which also illustrates a T connection 56 leading from an overflow pipe 58 terminating in the forward portion of tank 10 somewhat below the level of the solenoids.

As best shown in Fig. 2, tank 10 is provided with a pair of lateral vertical partitions 60 and 62, each of which extends to within a short distance of the bottom of the tank, here shown as a forwardly inclined false bottom 64 adapted to cause liquid in the tank to flow completely out of the tank when any of the above described dump valves is opened. Partition 62 acts as a baffle for fluids entering the rear wall of the tank as described below, and between them the two partitions define the space for receiving the exposed films, which may be secured to conventional film holders or racks. To this end, there are provided a series of parallel rods 66 extending from front to rear and mounted at their ends in the partition walls, from which rods the film holders may be suspended.

A water supply pipe 68 extends into the rear wall of tank 10, and may be connected as by a flexible hose to any convenient source of running water. A solenoid operated valve 70 is connected in this pipe, to control the admission of wash water to tank 10. As shown in Fig. 2, storage tank 14, here adapted to contain a developer solution, is partitioned off as at 72 to provide a forward liquid storage space 74 and a rearwardly located pump compartment 76 within which is mounted a pump 78 driven by a motor 80 and adapted to draw liquid (here developer solution) from space 74 through a pipe 82, and to force the same upwardly through a pipe or conduit 84 to tank 10. Pipe 84 enters tank 10 at a slight downward inclination, as indicated at 86, so that any fluid in this section of the pipe will drain into the tank when operation of the pump 78 is discontinued. Any desired form of immersion heater 88 may be mounted within tank 14, and may be suitably controlled, as by a thermostat 89 (Fig. 2), to ensure that the temperature of the treating fluid is adequately high for the process, As shown in Fig. 3, the tank 12 is arranged in a manner symmetrical to tank 14, and is provided with a duplicate partition, pump, piping and immersion heater, these elements of tank 12 being denoted by the same reference characters as in the case of tank 14, with the addition of a prime; e. g., the partition is denoted 72'. Tank 12 is here intended to store a supply of fixing solution which is pumped to, and drained from, treatment tank 10 in accordance with an automatically controlled cycle hereinafter more fully described, while tank 14 contains a supply of the developing solution.

Secured to the rear wall of tank 10 there is provided a blower 90 adapted to drive outside air through a suitable electric heater 92 and thence into tank 10 for the purpose of accelerating the drying of films therein when desired. A series of louvres or apertures 94 is provided in the front wall 16, above the maximum level of any liquid therein, to permit egress of this air. Baffles 60 and 62 ensure circulation of this drying air about the processed films. The latch for cover 26 (Fig. 1) comprises a solenoid 95 mounted on the under side of the cover to control a spring pressed latch 96 normally engaging a stop 97 on a vertical wall of tank 10. When this solenoid is energized at the end of a cycle, by depressing button 99, the cover may be raised by lifting on a conventional handle 98.

Figs. 5 and 6 illustrate the details of one form of timer control adapted for use in our machine. The principal element of this timer is a constant speed motor 100 which may be an alternating current synchronous motor or a direct current or universal motor of a constant speed type. In any event, the motor is provided with integral gearing to give its shaft 102 a speed of one revolution in slightly more time than is required for one complete cycle of film treatment at ordinary temperatures. This may conveniently be one revolution in thirty minutes. Motor 100 is secured to the rear side of front panel 16 by three mounting straps 104, 106 and 108, the latter of which is shown broken away in Fig. 5 for clarity in showing the cam shaft now to be described.

The shaft 102 of motor 100 is connected to a cam shaft 110, and the opposite end of the cam shaft extends through front panel 16 and carries an adjusting and indicating knob 114 carrying the pointer 22 which may cooperate with a developer temperature scale 116 marked on the front of the panel. In Fig. 7 of the drawings, the eight cams carry numerals 118, 120, 122, 124, 126, 128, 130 and 132, and each one of these cams is shown as coacting with a lever type of switch designated by the same numerals but bearing a prime mark; e. g., switch 118' coacts with cam 118. As best shown in Fig. 6, the various switches are mounted in a row along and connected to the support strap or bracket 106, in such a way that the lever of each may be swung to circuit-making position by the passage of a lobe or lobes projecting from the otherwise circular periphery of the corresponding cam.

The manner in which a properly timed sequence of operations of the various control elements is achieved by the above-described arrangement will now be explained in connection with Fig. 7, which illustrates in schematic form the arrangement of the eight cam discs and their corresponding switches. In the position shown in Fig. 7, the timer mechanism is in its position of rest before initiation of a cycle. Power is obtained from any desired source, such as the supply mains L1 and L2, whenever lid 26 is closed to close switch 29. Operation of the "start" button 20 completes a circuit through the coil 134 of a conventional form of mechanically locked relay, causing its armature 136 to complete a circuit from L1 to the motor 100, whose other side is always connected to L2. The motor immediately starts to rotate in the direction of the arrow, and initial movement of control cam 118 opens its switch 118' whose function will be described below. Relay armature 136 now being mechanically locked up, rotation of timer motor 100 continues through one full revolution, even though momentary switch 20 is released; at the end of such revolution, the lobe of cam 118 closes the power circuit of the release coil 138 and allows armature 136 to release, breaking the motor circuit and stopping the rotation of the cam shaft. Simultaneously, armature 136 prepares a circuit through back contact 140, normally open door-switch or push button 99 and door locking solenoid 95, mentioned above, so that, after completion of the treatment cycle, operation of button 99 will enable the lid or cover 26 to be raised for removal of the processed films. The purpose of providing push switch 99 in this circuit, instead of directly connecting the solenoid 95 for energization of switch 118' at the completion of the cycle is simply to prevent the solenoid from drawing power during periods when the machine is not in use, except at such times as it is desired to unlock the cover 26.

In order for door 26 to be opened intentionally during a machine cycle, as for example when an emergency requires a brief and immediate inspection of a developed film before it is fixed and washed, there is provided a push button or momentary switch 142, which is desirably located in a relatively hidden position on the apparatus (not on the control panel) so that a properly advised person can open the door by an intentional and simultaneous operation of both of switches 99 and 142. This feature is also valuable in case of a breakdown in the timing mechanism, in which circumstances, inability to remove the films might cause their ruin from excessive development or the like. However, the possibility that an ill-informed or meddlesome person will open the cover 26 with consequent damage to partly processed films is reduced practically to zero.

The "in use" signal lamp 18 may desirably be connected in parallel with the leads to motor 100, so that it glows whenever the motor is energized, and hence whenever a machine cycle remains uncompleted.

The operation of the remaining seven cams on camshaft 110 is considered obvious from the legends applied thereto in Fig. 7; suffice it to say that the lobe on cam 120 operates switch 120' to energize the motor 80 of pump 78 which pumps developer fluid from tank 14 into the treatment tank 10 until the level has risen sufficiently to open a normally closed liquid-level switch 144 (see also Fig. 2) operated through a float 146 suspended therefrom by an operating rod. Shortly thereafter, further rotation of cam 120 opens switch 120' and development proceeds until the next cam (122) closes switch 122' completing the circuit to solenoid 42, which opens dump valve 50 and returns the fluid to its storage space. A similar action results as each of the cam lobes comes into effective relationship to the corresponding switch. In the case of cam 124, two lobes are provided, since the rinse water valve 70 is to be opened between the development and fixing stages, as well as after the latter, although the rinsing time between developing and fixing may be much shorter than that allotted to the final washing. For the same reason, two lobes are provided on the cam 126 controlling the dump valve 40 which allows the used rinse water to pass into the drain connection 36 and hence to the sewer or sink. Cams 128 and 130 control the fixer pump 78 and fixed dump valve solenoid 38 respectively.

It will be understood that the sizes, measured circumferentially, of the lobes of the various control cams are not shown to scale in Fig. 7, but these relative sizes may be chosen to provide any desired relative times for the various phases of the cycle.

While the provision of a jacketed storage tank for the developer and fixer solutions makes it possible to control the temperatures of these baths with some accuracy, it may nevertheless sometimes be necessary or convenient to alter the actual time of development slightly, as during exceptional extremes of weather or installation conditions. It is for this reason that we have provided a friction clutch 112 between cams 120 and 122, and it will be seen that adjustment of the position of dial 114 with respect to scale 116 when the timer is in its rest position, will alter the phase relationship between cam 120 (controlling the developer pump motor), and cam 122 controlling the developer dump valve. By this means, the length of time that the developer solution remains in the treatment tank 10 can be adjusted. As best shown in the enlarged detail of Fig. 8, the extent to which this adjustment may be made is limited by a lug 148 on one of the clutch members, which travels between two pins 150 on the other. The spacing of these pins is sufficiently small so that the phase relation of the cams cannot, even advertently, be shortened or extended beyond limits imposed by the minimum and maximum development times for any temperatures over which development can be successfully carried out. Since motor 100 is irreversible (due to the very high internal gear ratio thereof), this limiting arrangement of lug and pins provides positive stops for the adjustment of dial 114 when the timer is at rest position, without interfering with the function of the pointer 22 as an indicator of the progress of the machine cycle through its successive phases. A scale of temperatures is marked on panel 16 for cooperation with pointer 22 to aid in setting clutch 122 properly before a cycle is initiated. Also, legends such as are shown in Fig. 1 as "develop," "fix" and "wash" are spaced about dial 114 whereby the position of pointer 22 indicates the approximate stage of the machine operation.

It will be seen from the above description that we have devised a machine for accomplishing the stated objects of the invention, but many changes and modifications may be made therein without departing from the scope of our invention as defined in the appended claims.

We claim:

1. Photographic film treatment apparatus comprising a light-excluding treatment tank having a substantially flat lower surface, means for supporting exposed photographic films or plates in said tank, a pair of treatment fluid storage tanks arranged directly beneath and in supporting relationship to said treatment tank, a pair of openings in the lower surface of said treatment tank each in direct communication with a respective one of said storage tanks, and a pair of valve elements mounted in said treatment tank for vertical reciprocation toward and away from said respective openings.

2. Fluid treating apparatus for photographic purposes, comprising a light-excluding treatment tank, a cover mounted on said tank and movable between open and closed positions, means for supplying a plurality of photographic treating fluids in succession to said tank and discharging the same therefrom in a predetermined cycle, latch means for locking said cover in closed position throughout said cycle, control means automatically operable upon completion of said cycle for retracting said latch means to unlock said cover, and a separate manually controllable element for rendering said control means operable independently of the completion of said cycle.

3. Fluid treating apparatus for photographic purposes comprising a light-excluding treatment tank, a cover for said tank movable between open and closed positions, means for supplying a plurality of photographic treating fluids in succession to said tank and discharging the same therefrom in a predetermined cycle, a latch for locking said cover in closed position throughout said cycle, a first manually operable element, control means automatically operable upon completion of said cycle for rendering said latch retractable upon operation of said first manually operable element, a second manually operable element, and connections between said second manually operable element and said latch for rendering the latter retractable, independently of completion of said cycle, upon simultaneous operation of both of said manually operable elements.

4. Fluid treating apparatus for photographic purposes, comprising a light-excluding treatment tank, means in said tank for supporting exposed photographic films or plates, a pair of fluid storage tanks disposed beneath said treatment tank and each having its upper surface in part directly beneath the bottom of said treatment tank, fluid transmitting openings in the bottom of said treatment tank and communicating with each of said storage tanks, and valves for closing said openings, the bottom of said treatment tank being slightly inclined to the horizontal to direct fluid draining out of said tank toward said openings.

5. Fluid treating apparatus for photographic purposes, comprising a light-excluding treatment tank, means in said tank for supporting exposed photographic films or plates, a pair of storage tanks secured beneath said treatment tank with a portion of the upper surface of each contiguous to the lower surface of said treatment tank and another portion of the upper surface of each extending laterally beyond the side walls of said treatment tank, and a cover member movably secured to each of said storage tanks for covering and uncovering the laterally extending portions thereof.

6. The invention in accordance with claim 5, individual pumps in communication with each of said storage tanks, connections from each of said pumps to said treatment tank to convey treating fluids thereto, and a baffle plate between the outlets of said connections and the space occupied by photographic elements held by said supporting means.

7. Photographic film treatment apparatus comprising a light-excluding treatment tank, means in said treatment tank for supporting photographic films or plates, a storage tank for developer fluid, a storage tank for fixer fluid, conduits for conveying fluid from each storage tank to said treatment tank in a predetermined sequence, fluid transmitting passages from said treatment tank to each storage tank for selectively returning fluids from the former to the latter, a liquid level switch in said treatment tank for limiting the flow of fluids in said conduits, means for admitting washing fluid to said treatment tank, and an overflow passage in said treatment tank arranged at a level above the operating level of said switch.

CYRUS KATZEN.
THOMAS R. GAMES.

REFERENCES CITED

The following references are of record in the file of this patent:

UNITED STATES PATENTS

| Number | Name | Date |
| --- | --- | --- |
| 750,665 | Lesperance | Jan. 26, 1904 |
| 1,114,909 | Pelton | Oct. 27, 1914 |
| 1,204,078 | Skidd | Nov. 7, 1916 |
| 1,918,061 | Simjian | July 11, 1933 |
| 1,985,554 | Smith | Dec. 25, 1934 |
| 2,135,685 | Wells | Nov. 8, 1938 |
| 2,176,954 | Clark | Oct. 24, 1939 |
| 2,194,345 | Winans | Mar. 19, 1940 |
| 2,226,360 | Spickelmier et al. | Dec. 24, 1940 |
| 2,325,837 | Dyer | Aug. 3, 1943 |
| 2,446,668 | Tuttle et al. | Aug. 10, 1948 |

FOREIGN PATENTS

| Number | Country | Date |
| --- | --- | --- |
| 407,243 | Germany | Dec. 19, 1924 |
| 711,776 | France | July 8, 1931 |